US010997438B2

(12) United States Patent
Nan et al.

(10) Patent No.: US 10,997,438 B2
(45) Date of Patent: May 4, 2021

(54) OBSTACLE DETECTION METHOD AND APPARATUS (71) Applicant: CloudMinds (Shanghai) Robotics Co., Ltd., Shanghai (CN)

(72) Inventors: Yibing Nan, Beijing (CN); Shiguo Lian, Beijing (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 21 days.

(21) Appl. No.: 16/443,566

(22) Filed: Jun. 17, 2019

(65) Prior Publication Data
US 2019/0303692 A1    Oct. 3, 2019

Related U.S. Application Data (63) Continuation of application No. PCT/CN2016/110786, filed on Dec. 19, 2016.

(51) Int. Cl.
G06K 9/00    (2006.01)
B25J 9/16    (2006.01)
(Continued)

(52) U.S. Cl.
CPC ........ G06K 9/00805 (2013.01); B25J 9/1666 (2013.01); G05D 1/0246 (2013.01);
(Continued)

(58) Field of Classification Search
CPC ....... G06K 9/00805; G06T 7/10; G06T 7/168; B25J 9/1666; G05D 1/0246; G06F 17/18
See application file for complete search history.

(56) References Cited

U.S. PATENT DOCUMENTS

2011/0157179 A1*  6/2011  Fahn ............... G06T 7/248
                                          345/427
2012/0050489 A1*  3/2012  Gupta ........... G06K 9/00798
                                          348/46
(Continued)

FOREIGN PATENT DOCUMENTS

CN    103413308 A    11/2013
CN    104111460 A    10/2014
(Continued)

OTHER PUBLICATIONS

International Search Report issued for corresponding International Patent Application No. PCT/CN2016/110786, dated Aug. 3, 2017, with an English translation.
(Continued)

Primary Examiner — Santiago Garcia
(74) Attorney, Agent, or Firm — Myers Wolin, LLC (57) ABSTRACT An obstacle detection method and apparatus are provided. The obstacle detection method provided includes: obtaining a to-be-detected image; determining a road surface area and a non-road surface area in the to-be-detected image according to pixel information contained in the to-be-detected image; respectively determining an outermost layer contour line of the road surface area and a contour line of the non-road surface area; and when the contour line of at least one non-road surface area is located in the area contained in the outermost layer contour line of the road surface area, determining a physical object contained in the at least one non-road surface area as an obstacle. The present application is applied to a process of detecting an obstacle.

8 Claims, 8 Drawing Sheets (51) Int. Cl.
*G05D 1/02* (2020.01)
*G06F 17/18* (2006.01)
*G06T 7/168* (2017.01)
*G06T 7/10* (2017.01)

(52) U.S. Cl.
CPC ............... *G06F 17/18* (2013.01); *G06T 7/10* (2017.01); *G06T 7/168* (2017.01)

(56) References Cited

U.S. PATENT DOCUMENTS

| | | | | |
|---|---|---|---|---|
| 2012/0170808 A1* | 7/2012 | Ogata | ............... | G06K 9/00798 382/103 |
| 2015/0347872 A1* | 12/2015 | Taylor | ............... | G06K 9/3233 382/224 |
| 2017/0132769 A1* | 5/2017 | Barron | ............... | G06K 9/6215 |
| 2018/0101177 A1* | 4/2018 | Cohen | ............... | G06K 9/00791 |
| 2018/0101957 A1* | 4/2018 | Talathi | ............... | G06T 7/10 |

FOREIGN PATENT DOCUMENTS

| | | |
|---|---|---|
| CN | 104574365 A | 4/2015 |
| CN | 105701844 A | 6/2016 |
| JP | 63-71604 A | 4/1988 |
| JP | 2004-117078 A | 4/2004 |
| JP | 2004-246554 A | 9/2004 |
| JP | 2011-76214 A | 4/2011 |

OTHER PUBLICATIONS

Notice of Reasons for Refusal issued by the Japanese Patent Office for corresponding Japanese Patent Application No. 2019-531669, dated Dec. 19, 2019, with full English translation attached.

* cited by examiner

To-be-detected image     Binary image     Preprocessed binary image

OBSTACLE DETECTION METHOD AND APPARATUS

CROSS-REFERENCE TO RELATED APPLICATIONS

This application is a continuation application under 35 U.S.C. § 120 of PCT application No. PCT/CN2016/110786 filed on Dec. 19, 2016, the contents of which are incorporated herein by reference.

FIELD OF THE INVENTION

The present application relates to the technical field of artificial intelligence, and in particular, to an obstacle detection method and apparatus.

BACKGROUND OF THE INVENTION

In mobile robots and blind guide systems, obstacle avoidance is one of the necessary basic functions, and how to effectively detect obstacles on road surfaces is a key problem needing to be solved by obstacle avoidance systems.

At present, commonly used obstacle detection modes include a non-visual detection mode based on infrared rays and ultrasonic waves or the like; a stereo vision detection mode based on Kinect and binocular cameras or the like, and a non-stereoscopic vision detection mode based on a single camera. However, these modes have corresponding defects and deficiencies. Wherein, the non-visual detection mode using the infrared rays and the ultrasonic waves and the like have limited detection accuracy, and may only detect obstacles with greater volumes and cannot detect small obstacles, so the safety is poor; and the obstacle detection mode based on the single camera often needs to specify an area of interest, and thus cannot automatically detect ground areas and obstacles in complex environments.

SUMMARY OF THE INVENTION

The embodiment of the present application discloses an obstacle detection method and apparatus for mainly solving the problem that the obstacle detection accuracy in the prior art is limited.

To achieve the above objective, the embodiment of the present application adopts the following technical solutions:

In a first aspect, an obstacle detection method is provided, including: obtaining a to-be-detected image;

dividing the to-be-detected image into a road surface area and a non-road surface area according to pixel information contained in the to-be-detected image; and detecting the non-road surface area surrounded by the road surface area, and when at least one non-road surface area is surrounded by the road surface area, determining the at least one non-road surface area as an obstacle area.

In a second aspect, an obstacle detection apparatus is provided, including:

an obtaining unit, configured to obtain a to-be-detected image; an area dividing unit, configured to divide the to-be-detected image into a road surface area and a non-road surface area according to pixel information contained in the to-be-detected image; a detection unit, configured to detect the non-road surface area surrounded by the road surface area; and an obstacle determining unit configured to, when the detection unit detects that at least one non-road surface area is surrounded by the road surface area, determine the at least one non-road surface area as an obstacle area.

In a third aspect, a computer storage medium is provided for storing a computer software instruction and including a program code designed to execute the above obstacle detection method.

In a fourth aspect, a computer program product is provided, which is capable of being directly loaded in an internal memory of a computer and contains a software code, and the computer program may implement the above obstacle detection method after being loaded and executed by the computer.

In a fifth aspect, a computer device is provided, including a memory, a communication interface and a processor, the memory is configured to store a computer executable code, the processor is configured to execute the computer executable code to control the execution of the above obstacle detection method, and the communication interface is configured to perform data transmission between the computer device and an external device.

In a sixth aspect, a robot is provided, including the above computer device.

According to the obstacle detection method provided by the embodiment of the present application, by obtaining the to-be-detected image, dividing the areas contained in the to-be-detected image into a ground area and non-ground areas according to the pixel information contained in the to-be-detected image, and by judging whether the ground area surrounds the non-ground areas, an obstacle is determined. Compared with various obstacle detection methods in the prior art, in the embodiment of the present application, because of different pixel features of different objects, even if a small object may be identified as the non-ground areas as long as its pixel features are different from the pixel features of the road surface, therefore, by adoption of the embodiment of the present application, the ground area and the non-ground areas may be clearly distinguished, and then the non-ground areas contained in the ground area are determine as the obstacle areas, so that the detection accuracy of the obstacle may be improved.

DETAILED DESCRIPTION OF THE EMBODIMENTS

A system architecture and a service scenario described in the embodiment of the present application are for the purpose of more clearly illustrating the technical solutions of the embodiment of the present application, and do not constitute a limitation of the technical solutions provided by the embodiment of the present application. Those of ordinary skill in the art may know that the technical solutions provided by the embodiment of the present application are also applicable to similar technical problems with the evolution of the system architecture and the appearance of new service scenarios.

It should be noted that, in the embodiment of the present application, the words "exemplary" or "for example" or the like are used for meaning examples, example illustration or illustration. Any embodiment or design solution described as "exemplary" or "for example" in the embodiment of the present application should not be construed as be more preferred or advantageous than other embodiments or design solutions. Properly speaking, the words "exemplary" or "for example" or the like are intended to present related concepts in a specific manner.

It should be noted that, in the embodiment of the present application, "of (English: of)", "corresponding (English: corresponding, relevant)" and "corresponding (English: corresponding)" may sometimes be mixed for use. It should be noted that, when the difference is not emphasized, the meanings to be expressed are the same.

Figure 1:
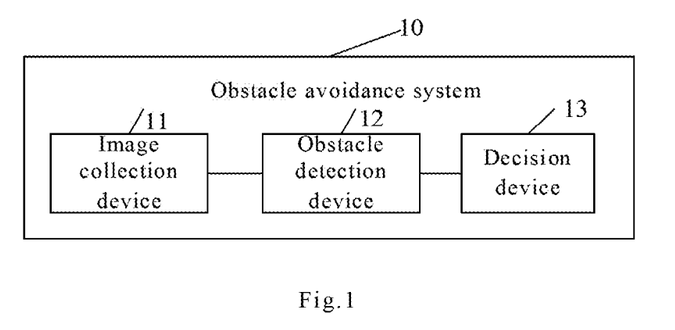
FIG. 1 is an architecture schematic diagram of an obstacle avoidance system provided by an embodiment of the present application.

An obstacle avoidance system is used for detecting whether there is an obstacle in a specific area, and may be applied to a mobile robot, a blind guide system or the like. Obstacle detection is a basic function of the obstacle avoidance system. The embodiment of the present application provides an obstacle avoidance system, as shown in FIG. 1, the obstacle avoidance system 10 includes: an image collection device 11, an obstacle detection device 12, and a decision device 13. Wherein, the image collection device 11 is configured to collect image information of a specific area for performing obstacle detection, such as an image in front of the mobile robot, and send the collected image information to the obstacle detection device 12; and exemplarily, the image collection device may be one or more cameras. The obstacle detection device 12 is configured to process the image information sent by the image collection device 11 to obtain information indicating whether an obstacle exists and the outline, size, position, type and the like of the obstacle, and send the information obtained by processing to the decision device 13. The decision device 13 is configured to make a decision on how to avoid obstacles according to the information sent by the obstacle detection device 12, and the decision device may be a device having a processing operation function. The specific implementation of the image collection device 11 and the decision device may refer to the prior art, and thus are not described repeatedly herein again.

It was found in actual research that the pixel information corresponding to different objects is different, and for a certain object, a common color thereof is generally fixed, that is, a color component of a corresponding pixel thereof, such as an RGB (Red Green Blue) value or an HSV (Hue, Saturation, Value, Hue, Saturation, Brightness) values are within a specific range, for example, a road surface is generally yellow, brown or black (such as the color of an asphalt road), and the trees are generally green or the like. Based on this, the embodiment of the present application provides a method for dividing a road surface area and a non-road surface area based on pixel information of an image, thereby determining an obstacle. The method may be applied to the obstacle avoidance system as shown in FIG. 1, and when applied to the obstacle avoidance system as shown in FIG. 1, the executive body of the method may be the obstacle detection device 12 in FIG. 1.

Figure 2:
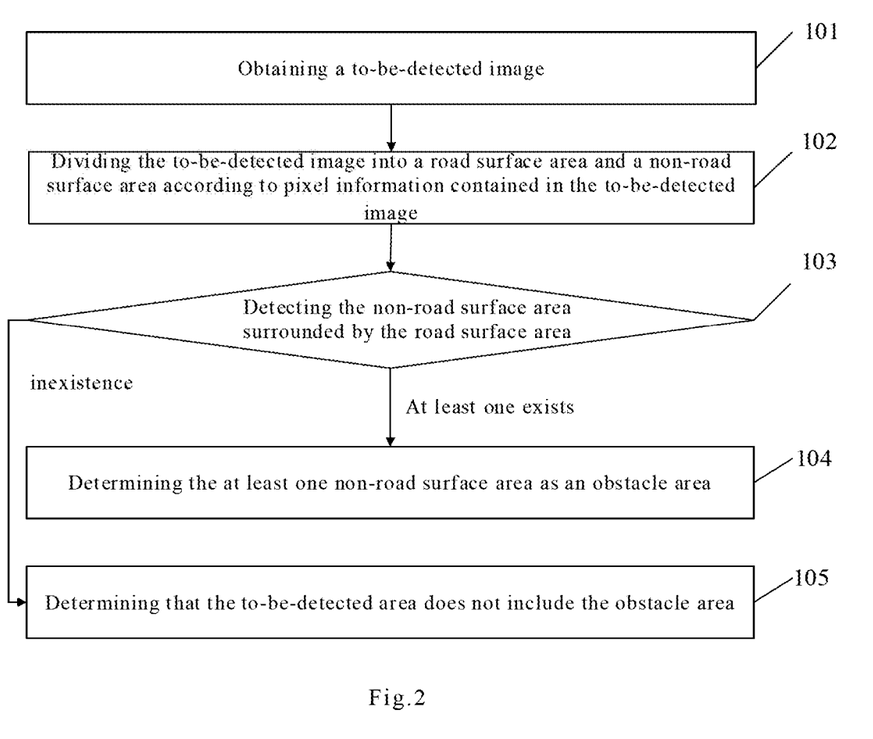
FIG. 2 is a schematic flow diagram of an obstacle detection method provided by an embodiment of the present application.

As shown in FIG. 2, the method includes:

101. Obtaining a to-be-detected image.

Wherein, the to-be-detected image is an image obtained by actually shooting a to-be-detected area, and the image is generally a color image.

When applied to the system as shown in FIG. 1, the to-be-detected image may be obtained by the image collection device 11 by actually shooting the to-be-detected area, and the to-be-detected image is sent to the obstacle detection device 12.

102. Dividing the to-be-detected image into a road surface area and a non-road surface area according to pixel information contained in the to-be-detected image.

Wherein, the pixel information contained in the to-be-detected image refers to a color component value corresponding to each pixel point in the to-be-detected image, such as an RGB value or an HSV (Hue, Saturation, Value, hue, saturation, brightness) value or the like. When the color component value corresponding to a certain pixel point in the to-be-detected image matches a road surface pixel, the pixel is determined as the road surface pixel, or otherwise, the pixel is determined as a non-road surface pixel. The area formed by all road surface pixels is the road surface area, and the area formed by the non-road surface pixels is the non-road surface area. In the to-be-detected image, the road surface area and the non-road surface area may be one or more.

In an implementation manner of the present step, a physical category corresponding to each pixel in the to-be-detected image may be determined at first, and the area corresponding to a physical object is determined as the road surface area or the non-road surface area according to the specific category of the physical object.

It should be noted that an outdoor road often includes traffic marking, therefore, in the embodiment of the present application, when the physical category corresponding to the pixel is a road surface or the traffic marking, the pixel corresponding to the physical object is determined as the road surface pixel; and when the physical object is other physical objects other than the road surface, such as tables and chairs, buildings and the like, the area corresponding to the physical object is determined as the non-road surface pixel.

In another implementation manner of the present step, it may be only determined that whether the to-be-detected image includes the road surface pixels, the area including the road surface pixels is determined as the road surface area, and the other areas are determined as the non-road surface areas.

103. Detecting the non-road surface area surrounded by the road surface area.

When at least one non-road surface area is surrounded by the road surface area, it may be preliminarily considered that the to-be-detected area contains the obstacle, and the next step 104 is executed; or otherwise, the step 105 is executed.

104. Determining the at least one non-road surface area as an obstacle area.

105. Determining that the to-be-detected area does not include an obstacle.

One implementation manner of the step 103 to the step 105 may be implemented by the following steps: detecting a contour line of the non-road surface area located in an outermost layer contour line of the road surface area; and when the contour line of at least one non-road surface area is located in the area contained in the outermost layer contour line of the road surface area, deeming that the at least one non-road surface area is surrounded by the road surface area, and then determining the at least one non-road surface area as the obstacle area.

Figure 3:
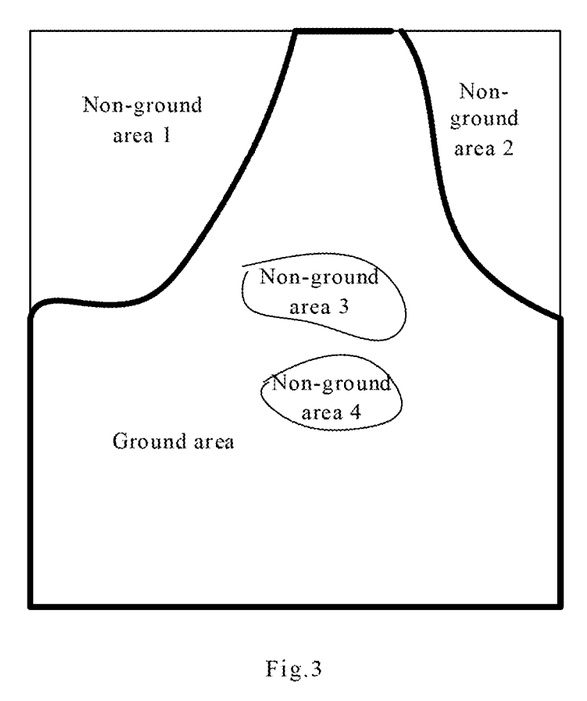
FIG. 3 is a schematic flow diagram of an obstacle detection method provided by an embodiment of the present application in combination with an actual application scenario.

In order to more clearly explain the above step 101 to the step 105, as shown in FIG. 3, after the processing of the step S101 to the step S105 is performed on the to-be-detected image, it may be determined that the to-be-detected image includes a ground area and a plurality of non-ground areas (a non-ground area 1, a non-ground area 2, a non-ground area 3 and a non-ground area 4 are respectively shown in the figure). Wherein, the contour lines of the non-ground area 3 and the non-ground area 4 are located in the outermost side contour line of the ground area 1 (the black bold contour line in the figure), therefore, the non-ground area 3 and the non-ground area 4 are determined as obstacle areas.

It should be noted that when the obstacle detection method provided by the embodiment of the present application is executed to the step 104, it may be directly determined that the obstacle area contains an obstacle, that is, the obstacle is detected, and the obstacle detection process is completed.

According to the obstacle detection method provided by the embodiment of the present application, by obtaining the to-be-detected image, dividing the areas contained in the to-be-detected image into the ground area and the non-ground areas according to the pixel information contained in the to-be-detected image, and judging whether the ground area surrounds the non-ground areas, the obstacle is determined. Compared with various obstacle detection methods in the prior art, in the embodiment of the present application, because of different pixel features of different objects, even if a small object may be identified as the non-ground area as long as its pixel features are different from the pixel features of the road surface, therefore, by adoption of the embodiment of the present application, the ground area and the non-ground areas may be clearly distinguished, and then the non-ground areas contained in the ground area are determine as the obstacle areas, so that the detection accuracy of the obstacle may be improved.

It should be noted that, in an implementation manner of the step 101, the to-be-detected image may be obtained by a single camera, and the implementation process of obtaining the to-be-detected image is less complicated and less costly. Compared with a non-stereoscopic vision detection method based on a single camera in the prior art, the obstacle detection method provided by the embodiment of the present application has the advantages that no area of interest needs to be specified, the ground area and the obstacle in complex environments may be stilled be automatically detected, and the adaptability to the complex environments is higher.

Figure 4:
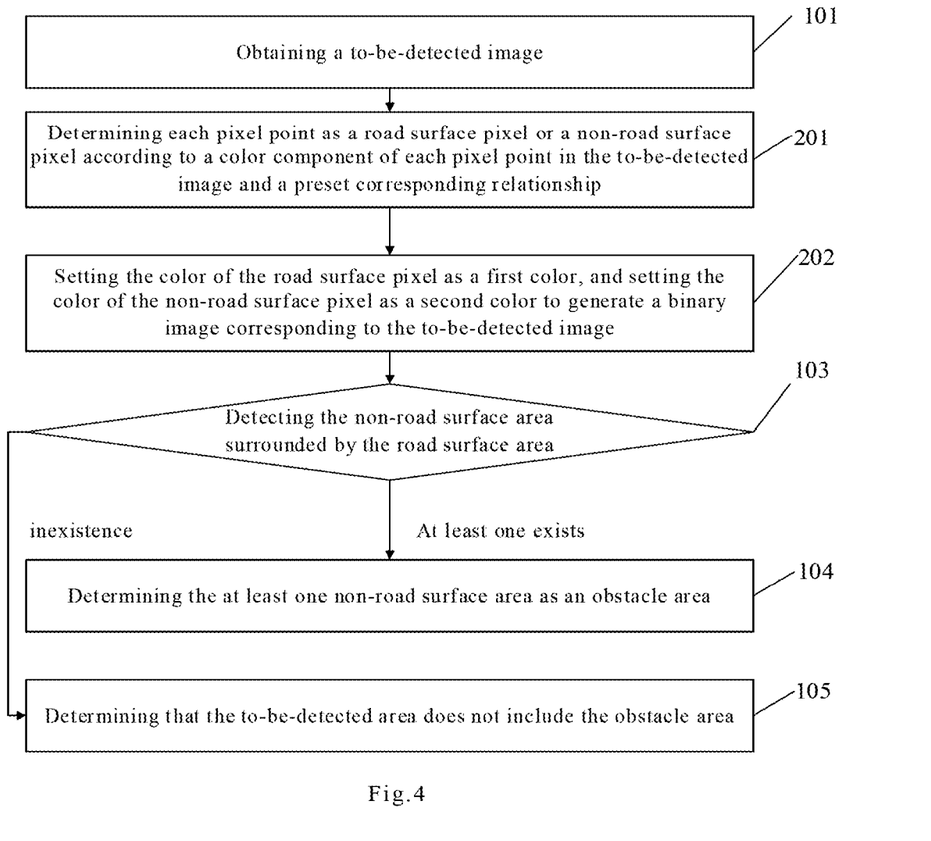
FIG. 4 is a schematic flow diagram of another obstacle detection method provided by an embodiment of the present application.

On the basis of the method as shown in FIG. 2, the embodiment of the present application provides a specific implementation manner of determining the road surface area and the non-road surface area in the to-be-detected area according to the pixel information in the to-be-detected image, and as shown in FIG. 4, the step 102 is specifically implemented by the following step 201 and the step 202:

201. Determining each pixel point as the road surface pixel or the non-road surface pixel according to a color component of each pixel point in the to-be-detected image and a preset corresponding relationship.

Wherein, the preset corresponding relationship includes: a color component value range corresponding to the road surface pixel.

Taking it as an example that the pixel color component is RGB, an implementation manner of a preset classification rule is as shown in Table 1 below:

TABLE 1

| RGB value of pixel point | Pixel category |
| --- | --- |
| RGB value range 1 | Road surface pixel |
| Other | Non-road surface pixel |

202. Setting the color of the road surface pixel as a first color, and setting the color of the non-road surface pixel as a second color to generate a binary image corresponding to the to-be-detected image.

The area of the first color in the binary image is the road surface area, and the area of the second color is the non-road surface area. The first color and the second color are two different colors. The binary image includes the first color and the second color. Illustratively, when the first color is white and the second color is black, a binary image including only black and white may be obtained.

Optionally, in order to improve the division precision of the road surface area and the non-road surface area, after obtaining the binary image, the method further includes: preprocessing the binary image to obtain a processed binary image. Wherein the preprocessing includes at least one of corrosion, expansion and filtering operations.

Wherein corrosion and expansion are two basic morphological operations. The morphological operations are a series of image processing operations based on shapes. An output image is generated by applying structural elements to an input image. Specifically, the corrosion is a process of eliminating boundary points and shrinking the boundary to the inside. It may be used for eliminating small and meaningless objects. The purpose of the corrosion operation in the embodiment of the present application is to merge the adjacent non-road surface areas. The purpose of the expansion operation is to merge all background points in contact with the object into the object to expand the boundary to the outside. The purpose of the expansion operation in the embodiment of the present application is to restore the area of the non-road surface area to be closer to the real size. The filtering operation may perform median filtering on the image. The median filtering method is a nonlinear smoothing technique, in which a gray value of each pixel point is set as a median of the gray values of all pixel points in a certain neighborhood window of the point, and in the embodiment of the present application, the purpose of the median filtering is to eliminate noise interference.

Figure 5:
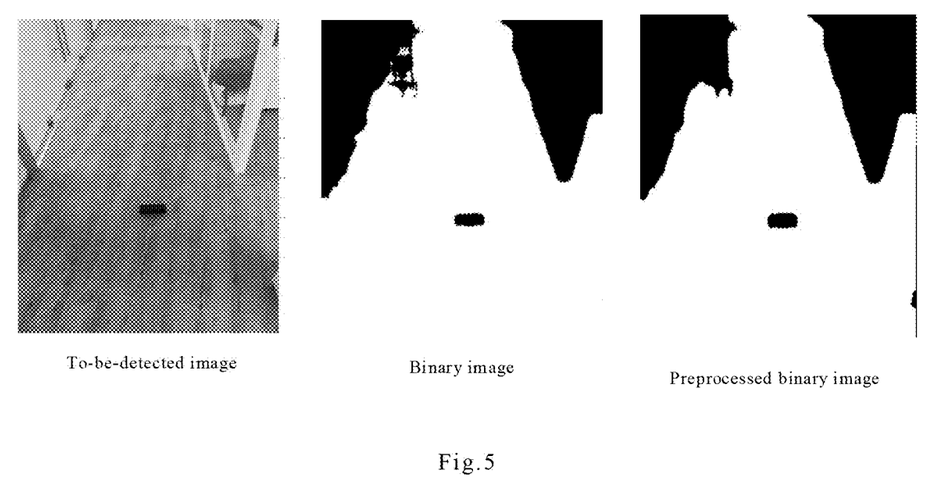
FIG. 5 is a schematic flow diagram of an obstacle detection method provided by an embodiment of the present application in combination with an actual application scenario.

In order to clarify the specific implementation process of the step 201 and the step 202, as shown in FIG. 5, the embodiment of the present application provides a specific implementation process of obtaining the binary image from the to-be-detected image and preprocessing the binary image, wherein a black portion in the binary image indicates the non-road surface area, and a white portion indicates the road surface area.

Figure 6:
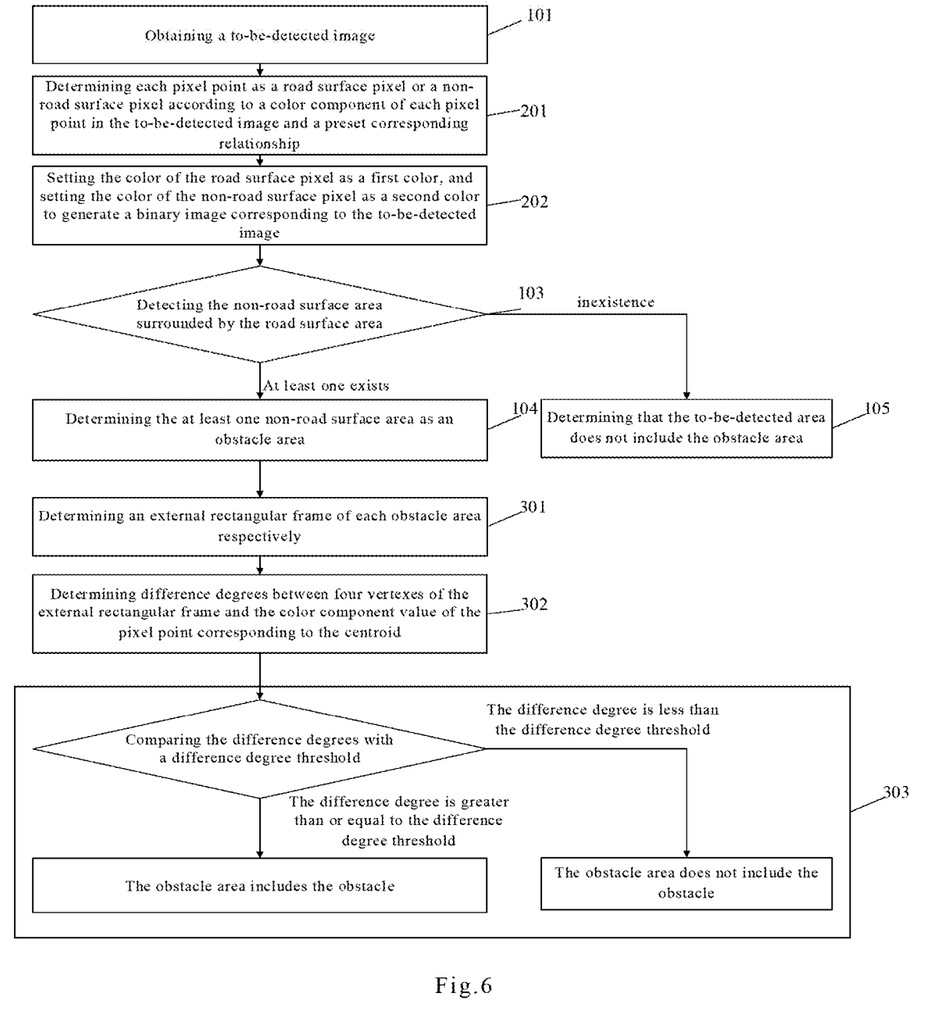
FIG. 6 is a structural schematic diagram of an obstacle detection apparatus provided by an embodiment of the present application.

In practical applications, if the obstacle area is directly determined to contain the obstacle, there may be an error, that is, there is a situation that false detection caused by identifying the ground area as the obstacle area result in that the obstacle area determined according to the step 104 does not include the obstacle actually. Therefore, on the basis of the method as shown in FIG. 2 or FIG. 4, in order to avoid the false detection caused by identifying the ground area as the obstacle detection area during the implementation of the step 102, in implementation manner of the embodiment of the present application, a specific implementation process of further determining whether the obstacle area includes the obstacle is further added. Therefore, in the step 104, after the at least one non-road surface area is determined as the obstacle area, as shown in FIG. 6, the method further includes:

301. Determining an external rectangular frame of each obstacle area respectively.

302. Determining difference degrees between four vertexes of the external rectangular frame and the color component value of the pixel point corresponding to the centroid.

303. Comparing the difference degrees with a difference degree threshold, and determining whether the obstacle area includes the obstacle according to the comparison result.

Wherein when the difference degree is greater than a preset difference degree threshold or greater than or equal to the preset difference degree threshold, it is determined that the obstacle area includes the obstacle. When the difference degree is less than the preset difference degree threshold or less than or equal to the preset difference degree threshold, it is determined that the obstacle area does not include the obstacle.

Exemplarily, for the non-ground area 3 and the non-ground area 4 as shown in FIG. 3, after the areas corresponding to the non-ground area 3 and the non-ground area 4 are initially determined as the areas where the obstacle is located by the above method, the above step 301 to the step 303 also need to be performed on the non-ground area 3 and the non-ground area 4 respectively to further determine whether the same include the obstacle.

Through the above step 301 to the step 303, the obstacle detection method provided by the embodiment of the present application may further detect all obstacle areas separately, thereby reducing the false detection.

Optionally, the preset corresponding relationship includes, in addition to the road surface pixels, a corresponding relationship between the other physical objects of a preset category and the pixel color component values.

Still taking as an example that the pixel color component is RGB, an implementation manner of the preset classification rule is as shown in Table 2 below:

TABLE 2

| RGB value of pixel point | Pixel category |
|---|---|
| RGB value range 1 | Road surface pixel |
| RGB value range 2 | Traffic marking pixel |
| RGB value range 3 | Wall surface pixel |
| RGB value range 4 | Table and chair pixel |

It should be noted that the foregoing RGB value ranges 1, 2, 3, and 4 are only examples, and in specific implementation, the preset classification rule may be obtained by establishing the corresponding relationship between different physical objects and their corresponding pixel information after performing statistical analysis on the pixels of various physical objects in actual applications in advance.

The preset classification rule may be continuously updated, for example, when the pixel information of a new type of physical object is learned, the corresponding relationship between the physical object and its pixel information may be established and stored in the preset classification rule.

Optionally, preset classification rules corresponding to actual application scenarios may be separately established according to the different actual application scenarios. For example: a preset classification rule for performing indoor obstacle detection and a preset classification rule for performing outdoor obstacle detection. Wherein the preset classification rule for performing indoor obstacle detection generally stores the corresponding relationship between indoor common physical objects such as walls, tables and chairs and the like and their pixel information. The preset classification rule for performing outdoor obstacle detection generally stores the corresponding relationship between traffic markings, trees, buildings, vehicles and the like and their pixel information. In this way, when the obstacle detection is performed, the preset rule corresponding to the scenario may be called according to the current scenario, and the specific implementation process of judging the current scenario may refer to the prior art, such as an image-based scenario identification method in the prior art or the like.

Figure 7:
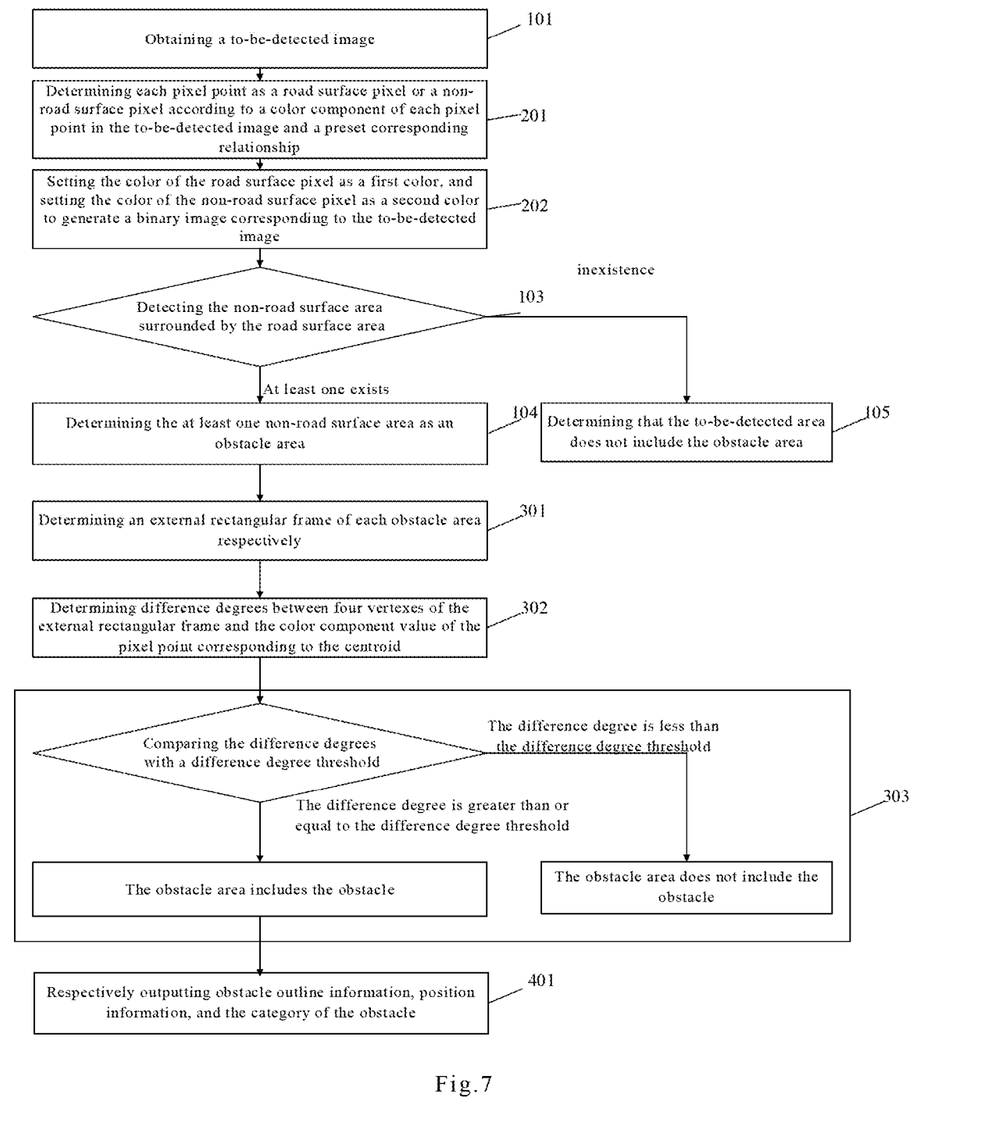
FIG. 7 is a structural schematic diagram of another obstacle detection device provided by an embodiment of the present application.

In combination with the foregoing implementation manner of the preset classification rule, as a supplement to the foregoing method, in order to provide more complete decision information for the obstacle avoidance decision, in the embodiment of the present application, after the step 104 "determining the at least one non-road surface area as an obstacle area" or the step 303 "determining the obstacle area includes the obstacle", as shown in FIG. 7, the method further includes:

401. Respectively outputting obstacle outline information, position information, and the category of the obstacle.

wherein the category of the obstacle is obtained according to the pixel color component value of the obstacle area and the preset corresponding relationship. The implementation process of determining the category of the obstacle may be executed when the step 201 is executed, or may be executed in other processes prior to the step 501 after the step 101 is executed.

When the method is applied to the system as shown in FIG. 1, the obstacle detection device 12 may send the information obtained in the step 401 to the decision device, so that the decision device 13 makes an obstacle avoidance decision based on the information.

Therefore, in the embodiment of the present application, after the obstacle is detected, the road surface area, the contour information of the obstacle, the position information, the category of the obstacle and other information may be separately determined, so that more complete decision information may be provided for the obstacle avoidance decision.

Figure 8:
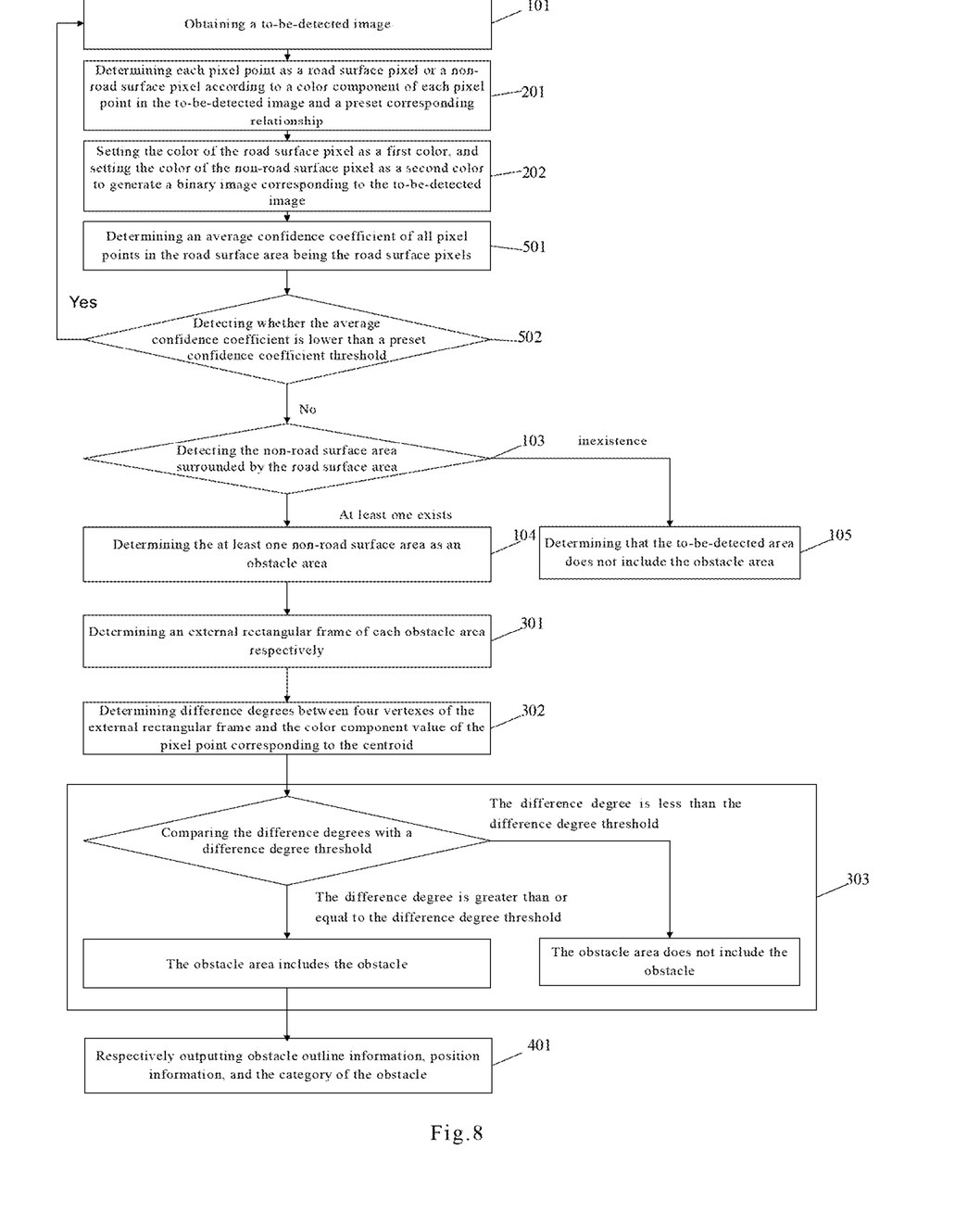
FIG. 8 is a structural schematic diagram of yet another obstacle detection device provided by an embodiment of the present application.

It should be noted that after the step 102 of dividing the to-be-detected image into the road surface area and the non-road surface area according to the pixel information contained in the to-be-detected image, as shown in FIG. 8, the method further includes:

501. Determining an average confidence coefficient of all pixel points in the road surface area being the road surface pixels.

502. If the average confidence coefficient is lower than a preset confidence coefficient threshold, obtaining the to-be-detected image again.

Wherein if the average confidence coefficient is lower than the preset confidence coefficient threshold, it indicates that the to-be-detected image does not include a road surface or includes the road surface but the road surface is not detected due to road surface conditions or illumination and other reasons, so that the to-be-detected image needs to be obtained again. Wherein the re-obtained to-be-detected image may be an image captured after the shooting angle is changed.

Those skilled in the art will readily appreciate that the present application may be implemented by hardware or a combination of hardware and computer software in combination with the units and algorithm steps of the various examples described in the embodiments disclosed herein. Whether a certain function is implemented in the form of hardware or driving the hardware via the computer software is determined by specific applications and design constraint conditions of the technical solutions. Those skilled in the art may implement the described functions by using different methods for each specific application, but this implementation should not be considered beyond the scope of the present application.

The embodiment of the present application may divide the function modules of the obstacle detection device according to the above method example, for example, the function modules may be divided according to the functions, and two or more functions may also be integrated into one processing module. The above integrated module may be implemented in the form of hardware and may also be implemented in the form of a software function module. It should be noted that the division of the modules in the embodiment of the present application is schematic and is only a logical function division, and other division manners may be provided during the actual implementation.

Figure 9:
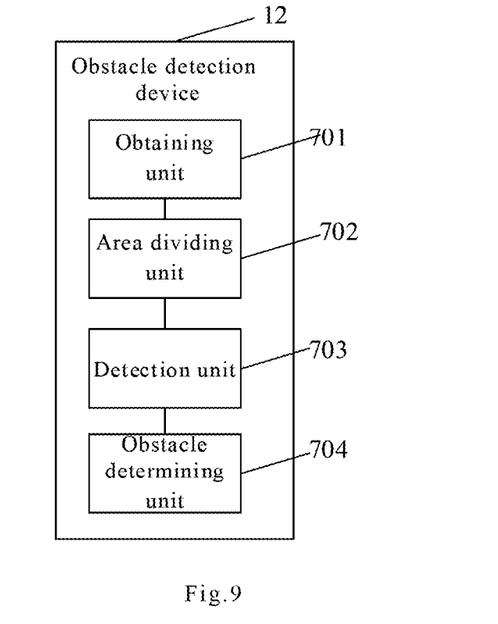
FIG. 9 is a structural schematic diagram of an obstacle detection device provided by an embodiment of the present application.

In the case that the function modules are divided according to the functions, FIG. 9 shows a possible structural schematic diagram of the obstacle detection device involved in the above embodiment, the obstacle detection device 12 includes: an obtaining unit 701, an area dividing unit 702, a detection unit 703 and an obstacle determining unit 704. The obtaining unit 701 is configured to support the obstacle detection device to execute the process 101 in FIG. 2 and the processes 501 and 502 in FIG. 8, and the area dividing unit 702 is configured to support the obstacle detection device to execute the process 102 in FIG. 2 and the processes 201 and 202 in FIG. 4; the detection unit 703 is configured to support the obstacle detection device to execute the process 103 in FIG. 3; the obstacle determining unit 704 is configured to support the obstacle detection device to execute the processes 104, 105, 301 to 303 in FIG. 3 and the process 401 in FIG. 7. All the related contents of the steps involved in the foregoing method embodiment may be quoted to the function descriptions of the corresponding function modules, and thus details are not described herein again.

Figure 10:
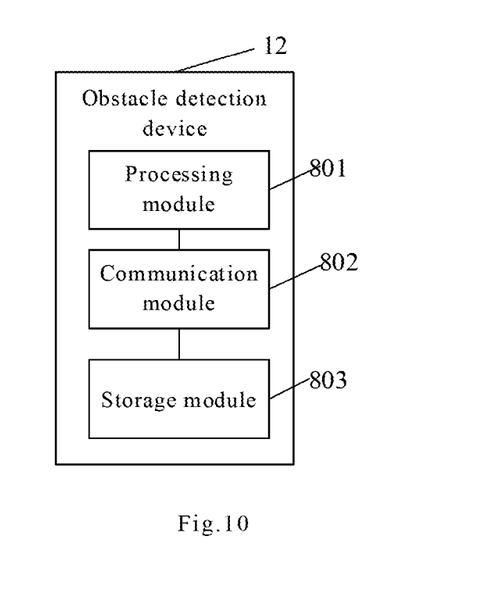
FIG. 10 is a structural schematic diagram of another obstacle detection device provided by an embodiment of the present application.

In the case of that the integrated unit is adopted, FIG. 10 shows a possible structural schematic diagram of the obstacle detection device involved in the above embodiment, the obstacle detection device 12 includes a processing module 801 and a communication module 802. The processing module 801 is configured to perform control and management on the actions of the obstacle detection device. For example, the processing module 801 is configured to support the obstacle detection device to execute the processes 101-105 in FIG. 2, the processes 201-202 in FIG. 4, the processes 301-303 in FIG. 6, the process 401 in FIG. 7 and the processors 501-502 in FIG. 8, and/or applied to other processes of the techniques described herein. The communication module 802 is configured to support the communication between the obstacle detection device and other network entities, such as the communication with the functional modules or network entities as shown in FIG. 1. The obstacle detection device 12 may further include a storage module 803, configured to store a program code and data of the obstacle detection device.

Wherein the processing module 801 may be a may be a processor or a controller, for example, may be a central processing unit (central processing unit, CPU), a general purpose processor, a digital signal processor (digital signal processor, DSP), an application-specific integrated circuit (application-specific integrated circuit, ASIC), a field programmable gate array (field programmable gate array, FPGA) or other programmable logic devices, transistor logic devices, hardware components or any combinations thereof. The processing module may implement or execute various of exemplary logic boxes, modules and circuits described in combination with the contents disclosed by the present application. The processor may also be a combination for implementing a computing function, for example, including one or more microprocessor combinations, a combination of a DSP and a microprocessor, and the like. The communication module 802 may be a transceiver, a transceiver circuit, a communication interface or the like. The storage module 803 may be a memory.

Figure 11:
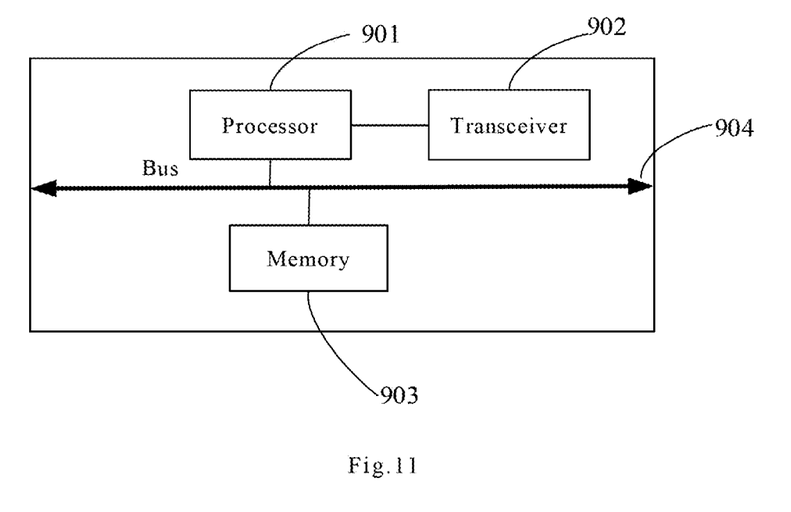
FIG. 11 is a structural schematic diagram of yet another obstacle detection device provided by an embodiment of the present application.

When the processing module 801 is the processor, the communication module 802 is the transceiver, and the storage module 803 is the memory, the obstacle detection device involved in the embodiment of the present application may be the obstacle detection device as shown in FIG. 11.

As shown in FIG. 11, the obstacle detection device 12 includes a processor 901, a transceiver 902, a memory 903 and a bus 904. Wherein the transceiver 902, the processor 901 and the memory 903 are connected to each other through the bus 904; the bus 904 may be a peripheral component interconnect (Peripheral Component Interconnect, PCI) bus or an extended industry standard architecture (Extended Industry Standard Architecture, EISA) bus or the like. The bus may be divided into an address bus, a data bus, a control bus and the like. For the ease of representation, the bus is only expressed by a thick line in FIG. 11, but it does not mean that there is only one bus or one type of bus.

The steps of the method or algorithm described in combination with the contents disclosed by the present application may be implemented in the form of hardware and may also be implemented by a processor executing software instructions. The embodiment of the present application further provides a storage medium, the storage medium may include a memory 903, configured to store a computer software instruction used by the obstacle detection device, and the computer software instruction includes a program code designed to execute a human-computer hybrid decision method. Specifically, the software instruction may be composed of corresponding software modules, the software modules may be stored in a random access memory (random access memory, RAM), a flash memory, a read only memory (read only memory, ROM), an erasable programmable read-only memory (erasable programmable ROM, EPROM), an electrically erasable programmable read-only memory (electrically EPROM, EEPROM) or any other form of storage medium known in the art. An exemplary storage medium is coupled to the processor, so that the processor may read information from and write information to the storage medium. Of course, the storage medium may also be a constituent part of the processor. The processor and the storage medium may be located in an ASIC. Additionally, the ASIC may be located in a core network interface device. Of course, the processor and the storage medium may also exist as discrete components in the core network interface device.

The embodiment of the present application further provides a computer program product, the computer program product may be directly loaded into the memory 903 and contains a software code, and the computer program may implement the above obstacle detection method after being loaded and executed by a computer.

The foregoing descriptions are merely specific embodiments of the present application, but the protection scope of the present application is not limited thereto. Any skilled one who is familiar with this art could readily think of variations or substitutions within the disclosed technical scope of the present application, and these variations or substitutions shall fall within the protection scope of the present application. Accordingly, the protection scope of the present application should be subject to the protection scope of the claims.

The invention claimed is:

1. An obstacle detection method, comprising:
    obtaining a to-be-detected image;
    dividing the to-be-detected image into a road surface area and a non-road surface area according to pixel information contained in the to-be-detected image; and
    detecting the non-road surface area surrounded by the road surface area, and when at least one non-road surface area is surrounded by the road surface area, determining the at least one non-road surface area as an obstacle area;
    wherein the dividing the to-be-detected image into a road surface area and a non-road surface area according to pixel information contained in the to-be-detected image comprises:
    determining each pixel point as a road surface pixel or a non-road surface pixel according to a color component of each pixel point in the to-be-detected image and a preset corresponding relationship, the preset corresponding relationship comprises: a color component value range corresponding to the road surface pixel;
    setting the color of the road surface pixel as a first color, and setting the color of the non-road surface pixel as a second color to generate a binary image corresponding to the to-be-detected image;
    wherein the area of the first color in the binary image is the road surface area, and the area of the second color is the non-road surface area;
    wherein after the determining the at least one non-road surface area as an obstacle area, the method further comprises:
    determining an external rectangular frame of each the obstacle area respectively;
    determining difference degrees between four vertexes of the external rectangular frame and the color component value of the pixel point corresponding to the centroid; and
    comparing the difference degrees with a difference degree threshold, and determining whether the obstacle area comprises an obstacle according to the comparison result.

2. The method of claim 1, wherein the detecting the non-road surface area surrounded by the road surface area comprises:
    detecting a contour line of the non-road surface area located in an outermost layer contour line of the road surface area; and
    when at least one non-road surface area is surrounded by the road surface area, determining the at least one non-road surface area as an obstacle area comprises:
    when the contour line of at least one non-road surface area is located in the area contained in the outermost layer contour line of the road surface area, determining the at least one non-road surface area as the obstacle area.

3. The method of claim 1, wherein the generating a binary image corresponding to the to-be-detected image comprises:
    preprocessing the binary image to obtain a processed binary image, the preprocessing comprises at least one of corrosion, expansion and filtering operations.

4. The method of claim 1, wherein the preset corresponding relationship further comprises a corresponding relationship between a physical object of a preset category and the pixel color component value;
    after determining that the obstacle area comprises the obstacle, the method further comprises:
    respectively outputting obstacle outline information, position information and the category of the obstacle, the category of the obstacle is obtained according to the pixel color component value of the obstacle area and the preset corresponding relationship.

5. The method of claim 1, wherein after the dividing the to-be-detected image into a road surface area and a non-road surface area according to pixel information contained in the to-be-detected image, the method further comprises:
    determining an average confidence coefficient of all pixel points in the road surface area being the road surface pixels; and
    if the average confidence coefficient is lower than a preset confidence coefficient threshold, obtaining the to-be-detected image again.

6. A non-transitory computer storage medium, configured to store a computer software instruction, and comprising a program code designed for executing the obstacle detection method of claim 1.

7. A computer device, comprising a memory, a communication interface and a processor, the memory is configured to store a computer executable code, and the processor is configured to execute the computer executable code to control the execution of the obstacle detection method of claim 1, and the communication interface is configured to perform data transmission between the computer device and an external device.

8. A robot, comprising the computer device of claim 7.

* * * * *